(12) United States Patent
Schaller

(10) Patent No.: US 7,363,905 B2
(45) Date of Patent: Apr. 29, 2008

(54) PROCEDURE TO OPERATE A COMBUSTION ENGINE IN THE EVENT OF DAMAGE AND A DEVICE TO PERFORM THE PROCEDURE

(75) Inventor: Werner-Ludwig Schaller, Lampertheim (DE)

(73) Assignee: Schaller Automation Industrielle Automations Technik KG (DE)

( * ) Notice: Subject to any disclaimer, the term of this patent is extended or adjusted under 35 U.S.C. 154(b) by 0 days.

(21) Appl. No.: 11/512,682

(22) Filed: Aug. 30, 2006

(65) Prior Publication Data

US 2007/0062481 A1 Mar. 22, 2007

(30) Foreign Application Priority Data

Sep. 16, 2005 (CH) .................................... 1513/05

(51) Int. Cl.
*F01M 11/10* (2006.01)
(52) U.S. Cl. ................ 123/198 D; 123/196 S
(58) Field of Classification Search ............ 123/198 D, 123/196 R, 196 S
See application file for complete search history.

(56) References Cited

U.S. PATENT DOCUMENTS 4,768,471 A * 9/1988 Draxler et al. ............ 123/41.15
5,987,975 A * 11/1999 Rafei ......................... 73/117.2
6,477,992 B2 * 11/2002 Hartke et al. ........... 123/73 AD
6,761,142 B2 * 7/2004 Suzuki et al. ............ 123/196 R
7,178,499 B2 * 2/2007 Wolf et al. ............... 123/196 S
2002/0151229 A1 * 10/2002 Kanno ........................... 440/1

FOREIGN PATENT DOCUMENTS

| | | |
|---|---|---|
| DE | 23 36 522 A1 | 2/1975 |
| DE | 102 13 896 A1 | 10/2003 |
| EP | 0 141 348 B1 | 5/1985 |
| EP | 0 507 500 B1 | 4/1995 |
| EP | 1 171 695 B1 | 1/2002 |
| FR | 1 086 725 | 2/1955 |

* cited by examiner

*Primary Examiner*—Tony M. Argenbright
*Assistant Examiner*—Jason Benton
(74) *Attorney, Agent, or Firm*—George Pappas

(57) ABSTRACT

Procedure to operate a combustion motor in the event of damage, whereby the thermoelectric voltage of a lubricant interruption on parts moving relative to each other and made of different, electrically conducting materials, is used to initiate an alarm signal, in that upon the appearance of such an alarm signal at least one operating parameter of the combustion engine is changed until the alarm extinguishes and the combustion motor is then further operated in a reduced operational state.

10 Claims, 2 Drawing Sheets

Figure 1:
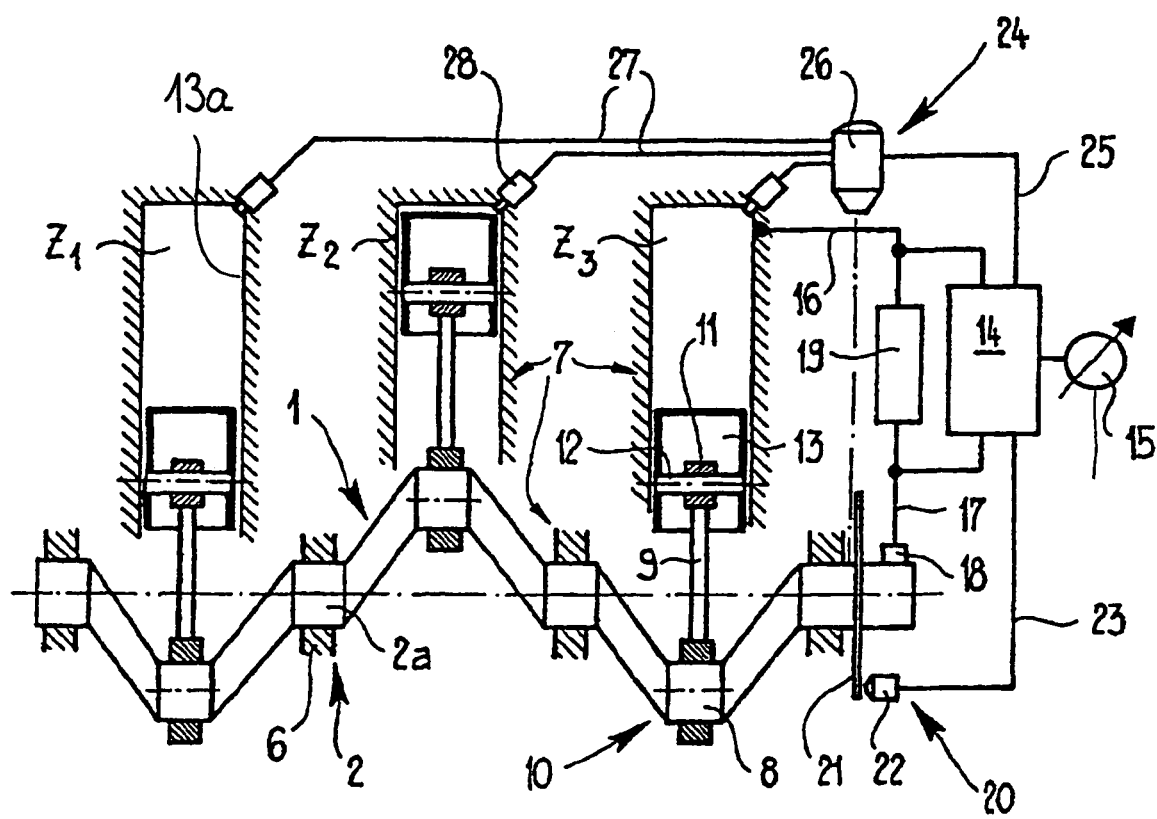

PROCEDURE TO OPERATE A COMBUSTION ENGINE IN THE EVENT OF DAMAGE AND A DEVICE TO PERFORM THE PROCEDURE

This application claims priority of application CH 0 1513/05 having a priority date of Sep. 16, 2005, the disclosure of which is hereby incorporated herein by reference.

FIELD OF THE INVENTION

The invention involves a procedure to operate a combustion engine in the event of damage, as well as a device to perform the procedure.

BACKGROUND OF THE INVENTION

Procedures and devices to monitor friction bearings, especially in a reciprocating piston engine, like a combustion engine, are known from EP-B-0 141 348. On the basis of the monitoring of the main bearing of a crankshaft of a combustion engine a procedure and a device are described for monitoring the lubrication at the contact point between two parts made of different, electrically conducting materials moving relative to each other and insulated form each other by a lubrication film. The two parts lie in an electrical current with a voltage source and an external connection and which flows through the lubrication location itself. The circuit resistance which reduces with the tearing off of the lubricating film, on the one hand, and the thermoelectric voltage, on the other hand, which serves as a galvanic voltage source and appears with the tearing off of the lubricating film at the contact location because of frictional heat, are used in order to produce a current flow, which acts as a control or alarm signal across the external electrical connection of the electrical circuit at the appearance of a large area of metallic touching of the two friction bearing parts caused by a lack of lubrication and thus signals heat damage. The connection of the electric circuit is constructed as a resistance which is electrically adapted to the large area contact location. The voltage drop appearing at the resistance of the external connection is measured and used to initiate a control signal. The control signal serves, for example, to stop the combustion engine or activate an alarm device. It is useful to so design the procedure and device, that in the event of a voltage spike appearing for a short time, the control signal activation is suppressed until a previously determined time frequency of the voltage peaks and/or an increasing tendency of the amplitude occurs. No information about a suitable method of further operating the combustion engine can be found in the document.

EP 1 171 695 contains a further development of the previously described monitoring, in that the damage location can be localized. Here, too, there is no information about a continued operation of the combustion motor in the event of damage.

SUMMARY OF THE INVENTION

It is the goal of the invention to provide a procedure and device to operate a combustion engine in the event of damage.

The goal is achieved by procedures to operate a combustion engine, as well as devices to perform the procedures disclosed herein.

Surprisingly, it was determined that the monitoring of damage to a combustion engine by means of the thermoelectric voltage of a lubrication interruption on parts moving relative to each other and made of different, electrically conducting materials, which previously was used to initiate an alarm signal or shut off a combustion engine, reacts so quickly, that it is also suitable for a further operation of the combustion engine in a reduced mode. In the process at least one operating parameter of the combustion engine is changed upon the appearance of an alarm signal, until the alarm signal extinguishes, so that the combustion engine can be further operated in this reduced mode.

Preferably, the thermoelectric voltage from the friction bearings is used as the alarm signal. However, it is also possible to alternatively or supplementally use thermoelectric voltages from cylinder surfaces for the alarm signal.

It is useful, if in the event of an alarm, different operating parameters are changed and then the most effective is used for the reduced operation. The adjustment of the operating parameter can occur manually in the simplest case. The configuration whereby the operating parameter is changed by means of a control device, however, is especially advantageous.

One embodiment of the invention provides a suitable device to perform the procedure, whereby an acquisition device is used, which is connected, on the one hand, by means of lines with the housing and, on the other hand, with the motor shaft of the combustion motor and emits an alarm signal upon the appearance of a significant thermoelectric voltage. The acquisition device is connected with a control device to control the regulating devices for the operating parameters of the combustion engine. It is especially advantageous, if the control device contains a computer which is connected to the regulating devices, in order to be able to determine the optimal operating parameter for the reduced operation for every different instance of damage.

SHORT DESCRIPTION OF DRAWINGS

Figure 2:
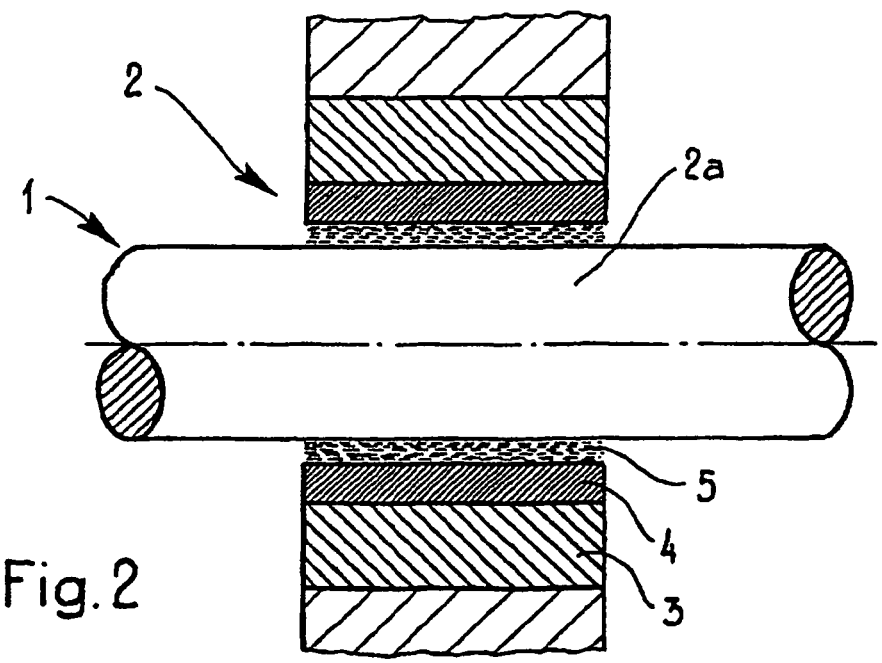
Figure 3:
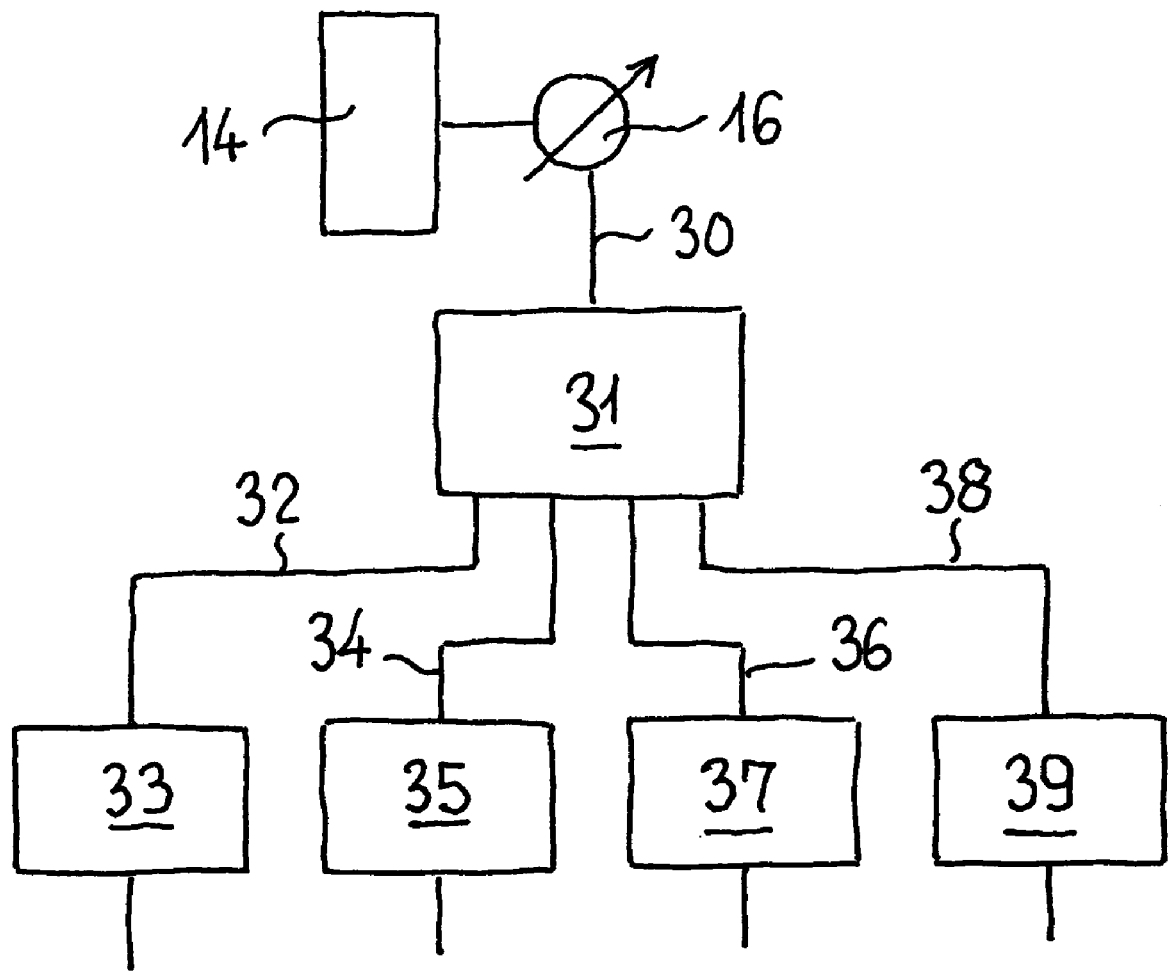

Execution models of the invention are described in more detail using schematic depictions; shown thereby are:

FIG. 1 Depiction of a vertical cut through a three-cylinder combustion motor;

FIG. 2 Main bearing of a crankshaft of the combustion engine of FIG. 1 in a larger scale and in a vertical cut;

FIG. 3 Depiction of a control device to control regulation devices for the operating parameters of a combustion engine.

DETAILED DESCRIPTION OF THE INVENTION

This invention proceeds from the state of knowledge of EP-B-0 141 348 and EP-B-1 171 695. FIG. 1 shows a depiction of a reciprocating combustion motor with, for example, three cylinders that operate according to the 4-cycle principle, which means one complete cycle occurs over two crankshaft revolutions or an angle of 720 degrees. The combustion motor contains a crankshaft 1 of a crank mechanism for the three cylinders Z1, Z2, Z3. The crank mechanism is lodged in friction bearings, so called main bearings 2, in which trunnions 2a rest in bearing seats 3, as can be especially seen in FIG. 2. To obtain good slide characteristics the bearing seats 3 are coated with, for example, a white alloy layer 4 on the side resting on the trunnions 2a, whereby a lubrication film 5 located between this white alloy layer 4 and the trunnion 2a prevents an overheating of the friction bearings. The bearing seats 3 are mounted on pedestals 6 which form a single piece with a common housing 7.

The crankshaft 1 contains a crank pin 8 for each cylinder Z1, Z2, Z3, to which a connecting rod 9 is attached across a big end bearing 10. The connecting rod 9 is connected across another friction bearing 11 with a piston pin 12 of a piston 13, which is guided up and down in cylinder Z1 or Z2 or Z3 along the cylinder running surfaces 13a. The construction of the big end bearing 10 and the friction bearing 11 of the piston pin is similar to the main bearing 2 of the crankshaft 1.

Now in order to acquire at any friction bearing the thermoelectric current resulting from the heat because of the interrupted lubrication film and finally the pairing of different metals at the friction bearings, the combustion engine is equipped with an acquisition device 14 which contains a display unit 15. On the one hand, the acquisition device 14 is connected to the housing 7 by means of a connecting line 16 and across a connection line 17 with a collector 18 that is electrically connected to the crankshaft 1. Parallel to the acquisition device 14 the connecting lines 16, 17 are short circuited across a low ohm resistance 19. Because of the thermoelectric voltage produced by galvanic means in the friction bearing, a thermoelectric current flow in the low ohm electrical circuit 16, 17, 18, 19, which initiates a voltage drop at the resistor 19. This signal is processed in the acquisition device 14 and sent to the display device 15.

The acquisition device 14 is equipped with a means 20 of determining the rotational angle of the crankshaft 1. In the process the means 20 manifest, for example, a pulse generator 21 that is connected to the crankshaft 1, whose angle-dependent signals, for example a bar code on the circumference, are acquired by a sensor 22 and sent across a line 23 to an acquisition device 14. In addition, the acquisition device 14 is equipped with the means 24 to determine the ignition sequence in cylinders Z1, Z2 and Z3. To accomplish this, there is, for example, a line 25 which is connected with an ignition distributor 26 that sends the ignition current through an ignition wire 27 to the individual spark plugs 28. The means 20 to determine the rotational angle or the means 24 for the acquisition of the ignition sequence can also be realized by an electronic control device for the combustion engine, the latter especially when the combustion motor is a diesel engine which does not have any spark plugs, but instead is equipped with a fuel injection or is aligned on the upper dead spot of the first cylinder Z1 through the calibration of the pulse generator.

Based on the alarm signal of the display device 15, the operating parameters of the combustion motor can then be manually changed until the alarm signal of the display device 15 extinguishes. Then the combustion engine can continue in this reduced operational state until a new alarm signal appears, whereby the reduced operational state of the combustion engine must be further reduced until the alarm again disappears. It has been seen that the reaction times of the acquisition device are so short, that the combustion engine can be further operated in the reduced mode without any damage. Such reaction times amount, for example, to only a few seconds. It is especially advantageous, however, if the device to perform the procedure, which is schematically depicted in FIG. 3, is present. In this process, the acquisition device 14 or the display device 15 are connected by means of a line 30 with a control device 31, which in turn is connected with the regulating devices for the operating parameters of the combustion engine. As an example, a regulating device 33 is attached here by way of a line 32 to control the injection quantity of fuel into the cylinder. A regulating device 35 is attached across a line 34 which serves to change the injection time for the fuel in the cylinder. A regulating device 37 is attached by a line 36, by means of which the oil pressure for the lubrication of the friction bearing can be adjusted. In addition, a regulating device 39 can be attached by means of a line 38 with which, for example, the power for an attached unit supplied from the combustion motor can be reduced. By means of regulating devices, the injection quantity and the time of the injection of the fuel can be changed as desired, as well as increasing or reducing the oil pressure for the lubrication of the friction bearing. The power from the combustion engine for an attached unit such as a generator for example, can be reduced.

In the procedure of the invention, it is basically not necessary to know which damage occurred where in the combustion engine; each instance of damage which initiates a thermoelectric current can cause a reduction of the operational mode. It is, however, more advantageous if the acquisition device simultaneously signals the location of the damage, as described in EP 1 171 695. Then there can be a change of the basic, primary operating parameters which are particularly critical for such a case of damage. It is advantageous, for example, in the case of bearing damage to the main bearing, to reduce the revolutions or the load. In the case of damage to a cylinder running surface, it is primarily recommended to increase the quantity and/or the pressure of the lubricant.

| | Figure Reference List |
|---|---|
| 1 | Crankshaft |
| 2 | Main bearing |
| 2a | Trunnion |
| 3 | Bearing seat |
| 4 | White alloy layer |
| 5 | Lubricant film |
| 6 | Pedestal |
| 7 | Housing |
| 8 | Crank pin |
| 9 | Connecting rod |
| 10 | Big end bearing |
| 11 | Frictional bearing |
| 12 | Piston pin |
| 13 | Piston |
| 13a | Cylinder running surface |
| 14 | Acquisition device |
| 15 | Display device |
| 16 | Connecting line |
| 17 | Connecting line |
| 18 | Collector |
| 19 | Resistance |
| 20 | Means for rotational angle |
| 20a | Means for rotational angle |
| 21 | Impulse generator |
| 22 | Sensor |
| 23 | Line |
| 24 | Means for ignition sequence |
| 25 | Line |
| 26 | Ignition distributor |
| 27 | Ignition wire |
| 28 | Spark plug |
| 30 | Line |
| 31 | Control device |
| 32 | Line |
| 33 | Regulating device for injection quantity |
| 34 | Line |
| 35 | Regulating device for injection time |
| 36 | Line |
| 37 | Regulating device for oil pressure |
| 38 | Line |
| 39 | Regulating device for power removal |
| Z1 | First cylinder |

-continued

Figure Reference List

| Z2 | Second cylinder |
| Z3 | Third cylinder |

The invention claimed is:

1. A method to operate a combustion engine in the event of damage, whereby the thermoelectric voltage of a lubricant break on parts moving relative to each other and made of different, electrically conducting materials is used to initiate an alarm signal, characterized by an operating parameter of the combustion engine being changed upon the appearance of such an alarm signal until the alarm extinguishes and the combustion engine is further operated in a reduced operational mode, and said thermoelectric voltage used comprising the thermoelectric voltage from frictional bearings, wherein said at least one operating parameter of the combustion engine changed upon the appearance of said alarm signal comprises reducing the power for an attached unit supplied from the combustion motor.

2. The method according to claim 1, characterized by the thermoelectric voltage from the cylinder running surfaces of the cylinder being used.

3. The method according to claim 1, characterized by various operating parameters being changed in the event of an alarm and then the most effective one being used for the reduced operational state.

4. The method according to claim 1, characterized by the operational parameters being manually changed.

5. The method according to claim 1, characterized by the operational parameters being changed by a control device.

6. A device to operate a combustion engine in the event of damage, whereby the thermoelectric voltage of a lubricant break on parts moving relative to each other and made of different, electrically conducting materials is used to initiate an alarm signal, wherein said thermoelectric voltage used comprises the thermoelectric voltage from frictional bearings, and wherein an operating parameter of the combustion engine is changed upon the appearance of such an alarm signal until the alarm extinguishes and the combustion engine is further operated in a reduced operational mode; wherein said at least one operating parameter of the combustion engine changed upon the appearance of said alarm signal comprises reducing the power for an attached unit supplied from the combustion motor, the device further comprising: an acquisition device connected on the one hand with the housing by means of lines and on the other hand with the motor shaft of the combustion motor, which emits an alarm signal upon the appearance of a significant thermoelectric voltage, characterized by the acquisition device being connected to a control device to control at least one regulating device for at least one operating parameter for the operation of the combustion motor.

7. Device according to claim 6, characterized by the control device containing a computer which is connected with the regulating devices, in order to be able to determine for every instance of damage the optimal operating parameter for a reduced operational condition.

8. The method according to claim 2, characterized by various operating parameters being changed in the event of an alarm and then the most effective one being used for the reduced operational state.

9. The method according to claim 2, characterized by the operational parameters being manually changed.

10. The method according to claim 2, characterized by the operational parameters being changed by a control device.

* * * * *